June 19, 1923.
J. T. ANTHONY
1,459,079
WASHING MACHINE
Filed July 9, 1921
2 Sheets-Sheet 1
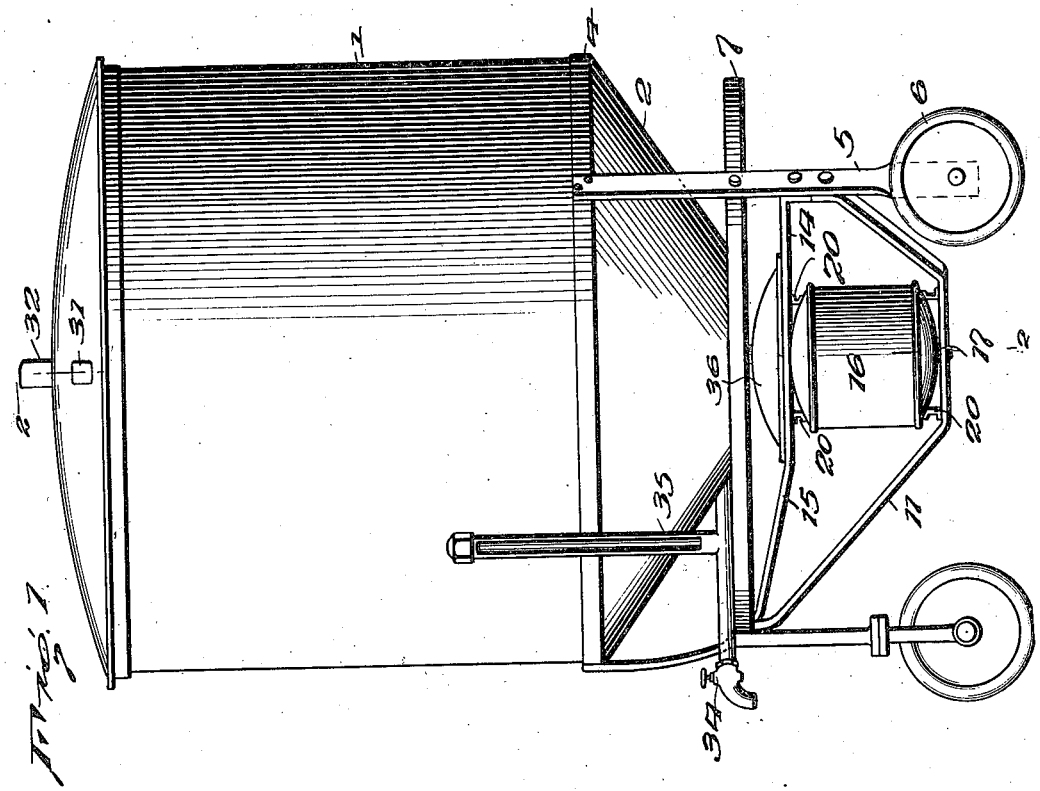
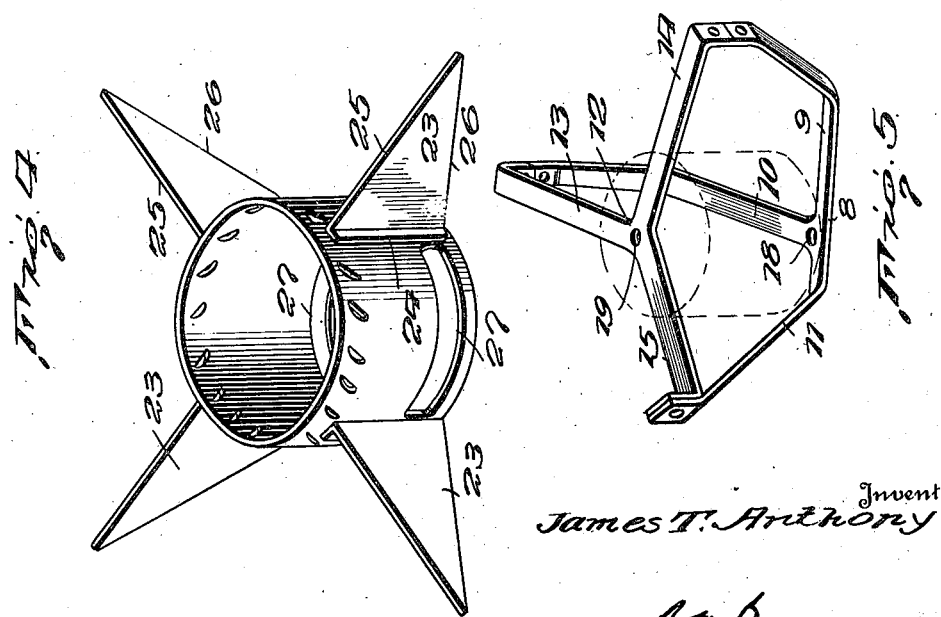
Inventor
James T. Anthony
By A. M. Duan
Attorney June 19, 1923.　　　　　J. T. ANTHONY　　　　　1,459,079
WASHING MACHINE
Filed July 9, 1921　　　2 Sheets-Sheet 2
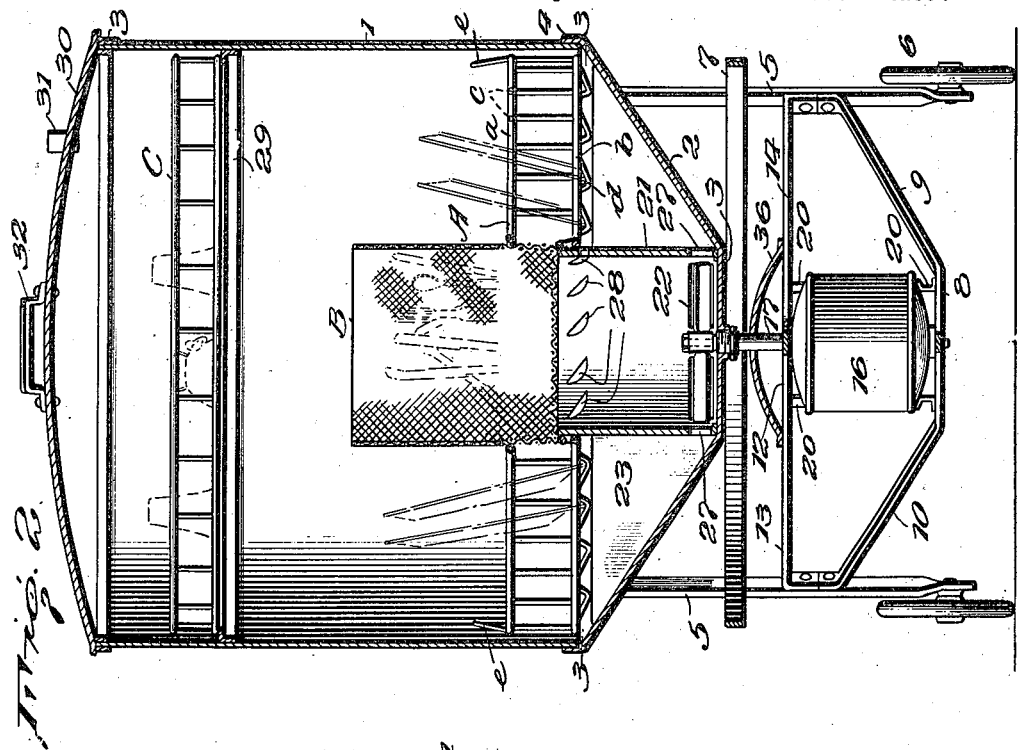
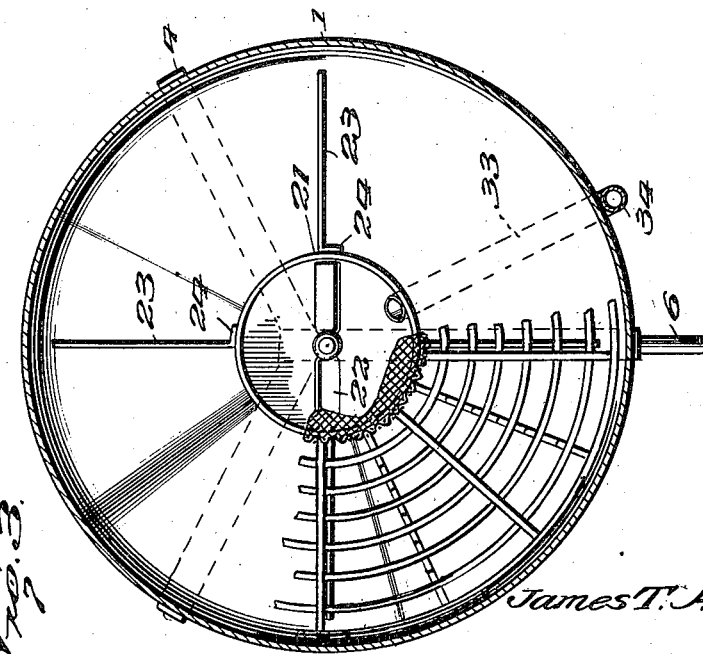
Inventor
James T. Anthony
By A. W. Dunn
Attorney Patented June 19, 1923.

1,459,079

UNITED STATES PATENT OFFICE.

JAMES T. ANTHONY, OF EAST ORANGE, NEW JERSEY.

WASHING MACHINE.

Application filed July 9, 1921. Serial No. 483,502.

*To all whom it may concern:*

Be it known that I, JAMES T. ANTHONY, residing at East Orange, in the county of Essex and State of New Jersey, a citizen of the United States, have invented certain new and useful Improvements in Washing Machines, of which the following is a specification.

This invention relates to improvements in washing machines, and especially to machines for rapidly and efficiently washing dishes, cups, saucers, glasses, knives and forks, pots, pans, and a great many other articles.

The principal object of the invention is the provision of a novel and improved form of apparatus whereby the cleansing fluid may be forcibly thrown upon the articles to be cleaned, and thereafter returned to a well for further utilization or for drainage. Other objects will be referred to in the following specification.

I have illustrated a preferred embodiment of my invention in the accompanying drawings which form a part of this application. In said drawings:

Figure 1 is a side elevation of a washing machine embodying my invention;

Fig. 2 is a section taken on the line 2—2 of Fig. 1;

Fig. 3 is a top view of a section taken on the line 3—3 of Fig. 2, and

Fig. 4 is an enlarged plan view of the distributor, hereinafter referred to, and Fig. 5 is a perspective view showing the motor support.

The apparatus includes a tank 1, of any suitable material, and which may be either cylindrical or of any desired contour. The lower portion 2 of said tank is preferably of a frusto-conical formation, the essential feature of this construction being the inward taper of the said lower portion as shown in Figs. 1 and 2, said portion terminating in a bottom 3.

Surrounding the tank 1, are bracing members 3 and 4, and, to the lower brace 4, are secured legs 5, carrying castors, or wheels 6, this construction being shown in Figs. 1 and 2. The tank is preferably constructed of sheet metal, and the braces and legs of strap iron. In the embodiment herein depicted I have shown three legs 5, but it is clear that I am not limited to that number.

Connected to the legs 5, about midway of their length, is another bracing member 7, and below said member is secured a motor support to be now described.

The motor support comprises a lower member 8, having upwardly and outwardly diverging arms 9, 10 and 11, and an upper member 12, provided with outwardly extending arms 13 and 14, and with another arm 15, which is both outwardly extending and upwardly inclined. As shown in Figs. 1, 2 and 3, the juncture of the arms 9, 10 and 11 form a flat seat, upon which rests an electric motor 16, the shaft 17 thereof being here shown as extending through an aperture 18, in the member 8, and the other end of the shaft extending through an aperture 19 in the upper member 12, and through a stuffing box in the bottom 3 of the tank 1. Suitable supporting and centering brackets 20 are provided, whereby the motor is securely fastened to the members 8 and 12, with its shaft in alignment with the apertures through which it extends.

A cylindrical distributor 21 is secured upon the bottom 3 of the tank 1, and, mounted upon the upper end of said shaft is an impeller 22, provided with one or more lifting blades designed and adapted to exert an upward thrust when the shaft 17 is rotated.

As shown in Figs. 2 and 3, the distributor 21 is exteriorly provided with a plurality of fins 23 which may be riveted to the distributor through flanges 24. The top edges 25 of said fins lie in a common horizontal plane, while the bottom edges 26 are inclined and coincide with and lie upon the inner surface of the lower portion 2 of the tank 1.

The lower portion of the distributor 21 is provided, between adjacent fins, with an elongated opening 27, it being noted that these openings are immediately adjacent the impeller 22. Arranged around the upper periphery of the distributor 21, and extending through the wall thereof, are a plurality of slots 28.

In the practical embodiment of my invention shown in the drawings, provision is made for holding the articles to be cleansed, and A indicates a tray which is shaped generally to conform to the interior contour of the tank 1. The tray is here shown as a wire structure provided with top and bottom rails $a$ and $b$, and with transversely extending members $c$ (shown in dotted lines) adapted to hold plates or dishes in an inclined position. The tray A is preferably of open cellular construction and the bottom $d$ thereof is corrugated to provide seats for the lower edges of plates or dishes when in the inclined position as indicated in Fig. 2.

It is to be noted that the lower portions of the bottom $d$ of the tray A are approximately in line with the slots 28, whereby the lower periphery of the articles held in position by said bottom $d$ are directly opposite said slots. It is to be further noted that the bottoms $d$ rest upon the top edges 25 of the fins 23, and serve to hold the tray in the proper position. Handles $e$ are provided whereby the tray A may be bodily lifted out of the tank 1.

Rigidly mounted upon the transverse members $c$, and directly above the open end of the distributor 21, is a tray B, adapted to contain knives, forks, spoons, etc. This tray is here shown as formed of wire screen, but may be of any other suitable material.

Mounted on a bracket 29 secured to the inner periphery of the tank 1 and near the top thereof, is a third tray C, primarily intended to hold cups, saucers, glasses, tumblers etc.

A cover 30, carrying a feed pipe 31, for use in supplying hot water to the tank, is provided for the tank 1, the cover also carrying a handle 32.

In order to empty the tank of the used water, I provide a vent pipe 33 carrying a valve 34, said vent pipe leading through the lower portion 2 of the tank, and into the extreme bottom portion of the distributor 21, in order that it may draw off all sediment, particles of food, grease, or other accumulations. Leading downwardly into said pipe 33, is a water gage 35, which may either contain a float carrying a stem emerging at the top, or which may be a calibrated sight gage. The gage 35 may be utilized as a feed pipe for the water, if desired, eliminating the necessity of the pipe 31.

The electric motor 16 should be of a high speed variety capable of 3000 R. P. M., and should be provided with instrumentalities whereby it may be set for any desired speed, and with connections for any fixed socket or other source of power.

In the operation of my machine, the cover 30 is elevated and the trays A, B and C filled with the articles to be cleaned. Enough hot water to practically cover the fins 23, is then led into the tank, through the feed pipe 31, and the motor 16 is put into operation. The revolving shaft 17 causes a rapid rotation of the impeller 22, and the water, which has entered the distributor 21 through the slots 27, is caused to assume a centrifugal whirl and is thrown upwardly around the inner surface of the distributor 21. Some of the water passes outwardly through the slots 28, and directly upon the lower portions of the soiled faces of the dishes in the tray A, whence it is deflected upwardly to the articles in the top tray C. It will be noted that the water thrown from the slots 28 will tangentially strike the plates in the tray A, because of the inclined position of said plates; it will therefore exert a scrubbing action thereon and the same water, after being deflected to the articles in the tray C, will again fall upon the plates in the tray A, for further cleansing.

A certain proportion of the water in the distributor 21, instead of being ejected through the slots 28, as above explained, will pass upwardly and directly out of the top of the distributor 21, against and through the rack B, cleansing the articles therein, and passing through the rack and up against the articles upon the rack C. Moreover it will be obvious that, since the water in the distributor is thrown upwardly with considerable force, in striking the bottom of the tray B, and the articles therein contained, a very considerable portion thereof will be deflected laterally.

The portion so deflected will be directed against the faces of the articles in rack A, and also against the sides of the tank and backwardly again against the bottoms of the articles in tray A, resulting in a thorough cleansing of said articles.

Experiments with my machine, as herein disclosed, have been made with and viewed through a glass tank, and it has been noted that, with the motor running between 2000 and 3000 R. P. M. a cloud of spray fills the tank and that the hot water is forcibly thrown against every exposed portion of all the articles contained in the racks A, B and C, resulting in a perfect cleansing of said articles. After the motor has been allowed to run for from one to two minutes, the unclean water is led off through the pipe 33, and clean hot water is fed in through pipe 31, for the purpose of rinsing, and the motor run a short while longer and stopped. The cover 30 is then removed and the trays taken out and allowed to stand for a few minutes, when the articles will be found to be not only thoroughly cleaned but perfectly dry.

In order to guard the motor against water of condensation dripping thereon, I provide a shield 36, secured to the arms 13, 14 and 15, and apertured to permit the shaft 17 to extend therethrough, as shown in Figs. 1 and 2.

The purpose of the fins 23 is two-fold; they serve to support the tray A, and position the contained articles at the desired location, and they also prevent the water in the lower portion 2 of the tank 1, assuming a centrifugal whirl. It is obvious that the water which is thrown upwardly by the impeller 22 will fall back upon the dishes, and will drain down the sides of the tank 1. This water will run down the funnel-shaped surface of the portion 2, to the distributor 21. The impulse of the rapid rotation of the impeller 22, however, would tend to cause the water in the portion 2, outside of the distributor 21, to assume a centrifugal whirl and rise upwardly along the inclined surface of the portion 2. This would result in an insufficiency of water in the distributor. It is obvious therefore that the fins 23, resting upon the floor of the portion 2, effectively resist all tendency of the water to assume the undesired centrifugal whirl.

Various modifications may be made in the apparatus set forth without departing from the scope of the invention as outlined in the appended claims, and I do not limit myself to the details here shown and described.

I claim:

1. A washing machine comprising a container provided with a body portion and a lower portion having inwardly converging walls, a hollow water distributor centrally positioned in said lower portion, a rotative impeller operably mounted in said distributor, an article tray carried by said distributor and extending around the upper end thereof, and a second article tray supported by said first tray immediately above the top of the distributor, said distributor being provided with a plurality of openings immediately adjacent the lower portion of said first named tray, substantially as described.

2. The combination with a washing machine provided with a container having one or more trays adapted to carry the articles to be cleaned, a conically shaped lower portion adapted to concentrate the cleansing fluid in the extreme bottom of the container, and a rotative impeller operably mounted in the extreme lower portion of said container, of an open mouthed distributor surrounding said impeller and being ported adjacent the latter to permit ingress of said cleansing fluid, means carried by the distributor for supporting said trays and apertures near the top of said distributor, adjacent said trays, to permit lateral egress of said fluid, substantially as described.

3. A washing machine comprising a container provided with a conically-shaped lower portion, a water distributor centrally located in said lower portion and provided at its bottom with ports adapted to permit ingress of water, a rotative impeller mounted in said distributor, opposite said ports, and radially extended fins connected to the outside of said distributor having their lower edges contacting the surface of the lower portion of said container, whereby to prevent circulatory motion of the water outside of and adjacent said distributor, substantially as described.

In testimony whereof I hereunto affix my signature.

JAMES T. ANTHONY.